United States Patent [19]
Wehde

[11] 3,790,225
[45] Feb. 5, 1974

[54] ELECTRICALLY ACTUATED VEHICLE BRAKE SYSTEM

[75] Inventor: Heinz Wehde, Heidelberg, Germany

[73] Assignee: Teldix G.m.b.H., Heidelberg, Germany

[22] Filed: Feb. 9, 1972

[21] Appl. No.: 224,670

[30] Foreign Application Priority Data
June 7, 1971 Germany............................ 2128169

[52] U.S. Cl............... 303/21 F, 188/162, 303/20, 303/21 AF
[51] Int. Cl............................. B60t 8/10, B60t 8/12
[58] Field of Search.. 60/54.6 E, 54.6 M; 92/34, 47; 188/162, 181, 370, 1 A; 303/7, 20, 21 AU; 340/522

[56] References Cited
UNITED STATES PATENTS

| | | | |
|---|---|---|---|
| 3,402,972 | 9/1968 | Cooper et al. | 303/20 |
| 3,350,142 | 10/1967 | Schuman | 303/7 |
| 3,507,542 | 4/1970 | Cannella | 303/7 |
| 3,589,481 | 6/1971 | Motsch et al. | 188/370 X |
| 2,515,468 | 7/1950 | Piron | 188/162 X |
| 3,613,356 | 10/1971 | Woodward | 188/162 X |
| 2,070,365 | 2/1937 | Leventis et al. | 188/162 |
| 2,920,656 | 1/1960 | Bertolet, Jr. | 92/47 X |
| 3,194,608 | 7/1965 | Rich | 188/1 A X |
| 3,319,532 | 5/1967 | Pridham, Jr. | 92/47 X |

FOREIGN PATENTS OR APPLICATIONS
1,961,039   6/1971   Germany............................ 303/21 P Primary Examiner—Duane A. Reger
Assistant Examiner—Stephen G. Kunin
Attorney, Agent, or Firm—Spencer & Kaye

[57] ABSTRACT

A brake system for a vehicle has devices responsive to electrical signals for causing the wheel brake cylinders to respond. An electrical position generator which is actuated by a driver during braking produces electrical control signals to initiate brake actuation. Each wheel to be braked has an associated hydraulic unit which defines a variable brake fluid volume and is connected to the respective wheel brake cylinder, so that a change in the brake fluid volume of the hydraulic unit influences the brake pressure in the wheel brake cylinder. A separate measuring device is provided for determining the force exerted on the brake of each wheel to be braked and for producing a corresponding electrical output signal. A separate control signal producing device is operatively arranged to respond to both the signal from the position generator and to the output signal from the separate associated measuring device for producing a control signal. A separate brake actuation device is provided for each wheel to be braked, each of the brake actuation devices being responsive to the control signal from a separate one of the control signal producing devices. Each of the brake actuation devices is operatively arranged to change the brake fluid volume defined by an associated one of the hydraulic units.

24 Claims, 9 Drawing Figures

ELECTRICALLY ACTUATED VEHICLE BRAKE SYSTEM

BACKGROUND OF THE INVENTION

This invention relates to a brake system for a vehicle. The present invention relates, more particularly, to a brake system for a vehicle comprising means responsive to electrical signals for causing the brake to respond whpn an electrical signal is applied and an electrical position generator actuated by the driver during breaking which generator produces electrical position signals which initiate the brake actuation.

In a known brake system of this type as disclosed in German Pat. No. 851,602, a current is produced in dependence on the actuation of the brake pedal which current is fed to an actuation device, e.g., a control magnet or a motor. The linear movement of the brake magnet or the rotary movement of the motor, respectively, is transmitted via a lever mechanism to the brake shoes and thus the brake is actuated.

One drawback of this known brake system is the need to use a lever mechanism. In the known brake system the brakes engage with different intensity which is a very serious drawback.

SUMMARY OF THE INVENTION

It is an object of the present invention to provide a brake system in which signals produced by a generator actuated by a driver are used to affect braking at all wheels with substantially uniform intensity.

It is another object of the present invention to provide a brake system which is free of lever mechanisms.

It is a further object of the present invention to provide a brake system which is an improvement of the brake system disclosed in German Pat. No. 851,602.

The foregoing objects, as well as others which will become apparent from the text which follows, are achieved in a vehicle brake system having devices which are responsive to electrical signals for causing brake means which include wheel brake cylinders to respond. An electrical position generator, which is actuatable by a driver, produces electrical position signals to initiate brake actuation. A separate hydraulic device which includes means defining a brake fluid volume is connected with the wheel brake cylinder of each wheel to be braked so that changes in brake fluid volume of each means defining a brake fluid volume influences the brake pressure in a respective one of the wheel brake cylinders. A separate measuring device is operatively arranged for determining the force exerted on the brake of each wheel to be braked and for producing a corresponding respective electrical output signal for each wheel to be braked. Control signal producing devices are provided which are individually responsive to a respective one of the output signals from the measuring devices and to signals from the position generator. A separate brake actuation device is operatively arranged to respond to the control signals from a respective control signal producing device and the individual brake actuation devices are connected to respective associated ones of the means defining brake fluid volumes and are effective for changing the brake fluid volumes.

The end result of the brake system according to the present invention is that with a given deflection of the brake pedal a brake pressure is produced at the individual brakes which does not depend on tolerances and the varying degree of wear of the brake linings; rather, the intended brake pressure is always available at all brakes.

The change in the volume of the brake fluid according to a feature of the present invention can be effected by means of a cylinder/piston arrangement on which an actuation device acts. A bellows can, however, be used in place of the cylinder/piston arrangement.

For example, it is possible to measure the force from the actuation device acting on the piston and to utilize this measuring result to produce a follow-up signal for controlling the actuation device. It is, however, more favorable and easier to measure the pressure within the wheel brake cylinder, to develop an analogue signal from the measurement, and to incorporate it in the control signal.

In order to adjust the position of the piston or the bellows, a control magnet may be used which effects the adjustment in dependence on its control current and thus varies the pressure. It is more favorable, however, to move the piston or the bellows with the aid of a motor whose rotation is translated into a longitudinal movement by means of two engaging gears.

With the appropriate selection of the pitch of the threads of the engaging gears it becomes possible to produce the required brake pressure without requiring a very high-powered motor. Such motors with threaded spindles are known, for example, from Offenlegungsschrift (Laid Open German Pat. application) No. 1,438,404, FIG. 8, which shows the rotor of the motor having an axial bore with a thread into which the spindle is screwed. Upon the rotation of the rotor the spindle, which is secured against rotation, moves in an axial direction. More suitable is an arrangement in which the spindle is screwed into a stationary threaded nut and the spindle is carried along by the rotor. The spindle and the rotor must, in this case, be movable in the axial direction with respect to one another. In a further embodiment, at least two parallel threaded spindles are provided which are driven by a motor via a gear mechanism and thus longitudinally displace a part having the corresponding counterthread which sits on these spindles. This solution has the advantage that the motor need not absorb any longitudinal or transverse forces and can thus be made very simple.

A d.c. motor which must be controllable in both directions of rotation is advantageously used as the motor. A stepping motor is most favorably used which has a holding moment for the spindle in each position so that it is not necessary to effect automatic blockage of the spindle via the pitch of the thread alone. This type of construction has the result that the rotary movement is supported by the pressure on the piston when there is a reduction in pressure. In the unfed state a mechanical brake can also act on the motor. This brake is made ineffective by an electromagnet when a control current is present.

The particularly favorable configuration of the bellows is also a feature of a preferred embodiment of the present invention.

A device for producing the control signals for the acutation device, which must also be provided for each wheel to be braked, produces a control signal for the actuation device with the aid of the signals from the position generator and the measuring device whenever the brake pressure required by the position of the brake pedal is not available. Thus a certain brake pressure corresponds to each position of the pedal. The brake pressure, however, may be different at the front or rear axle, respectively, or may be controllable in dependence on the load of the vehicle. A bridge circuit is favorably used whose bridge branch resistances are influenced at least in part by the position generator on the one hand and the measuring device on the other hand. If the actual brake pressure does not coincide with the brake pressure required by the momentary position of the position generator, the bridge is out of balance. The signals then appearing in the bridge diagonals or signals derived therefrom are then used to control the actuation device and then correspondingly adjust it.

Advantageously the control apparatus constituted by the actuation device, variable volume, brake power measuring device, comparator and control circuit is designed as a three-mode controller which is able to cause the pressure to rise, remain constant and drop. In order to be able, when a motor is used, to stop it rapidly as soon as the control voltage disappears, the motor winding is connected to a resistor when the control circuit is in this position.

In the system according to the present invention it is also possible to indicate in a simple manner the occurrence of a leak or the advanced wear of the brake lining, respectively, in that an actuation device is provided for the contact of a warning circuit which is moved when there is a change in the volume of the brake fluid and which actuates the contact when there is a reduction beyond a given value.

The electrical brake system according to the present invention may be used in an advantageous manner for anti-locking controls. Control signals may be derived from the signals supplied from sensors which indicate a tendency to lock, such as, for example, a deceleration of a certain magnitude in the rotational speed of the wheel and/or the occurrence of a certain slip in the wheel, which control signals can also control the actuation device as a further command variable. Preferably a control circuit comprising the wheel sensor for slip or rotational deceleration at the wheel, an evaluation circuit for these signals, the actuation device, the brake fluid volume and the brake is formed upon the occurrence of a tendency to lock, the output signals of the evaluation circuit effecting the control of the actuation device.

DESCRIPTION OF THE PREFERRED EMBODIMENTS

Figure 1:
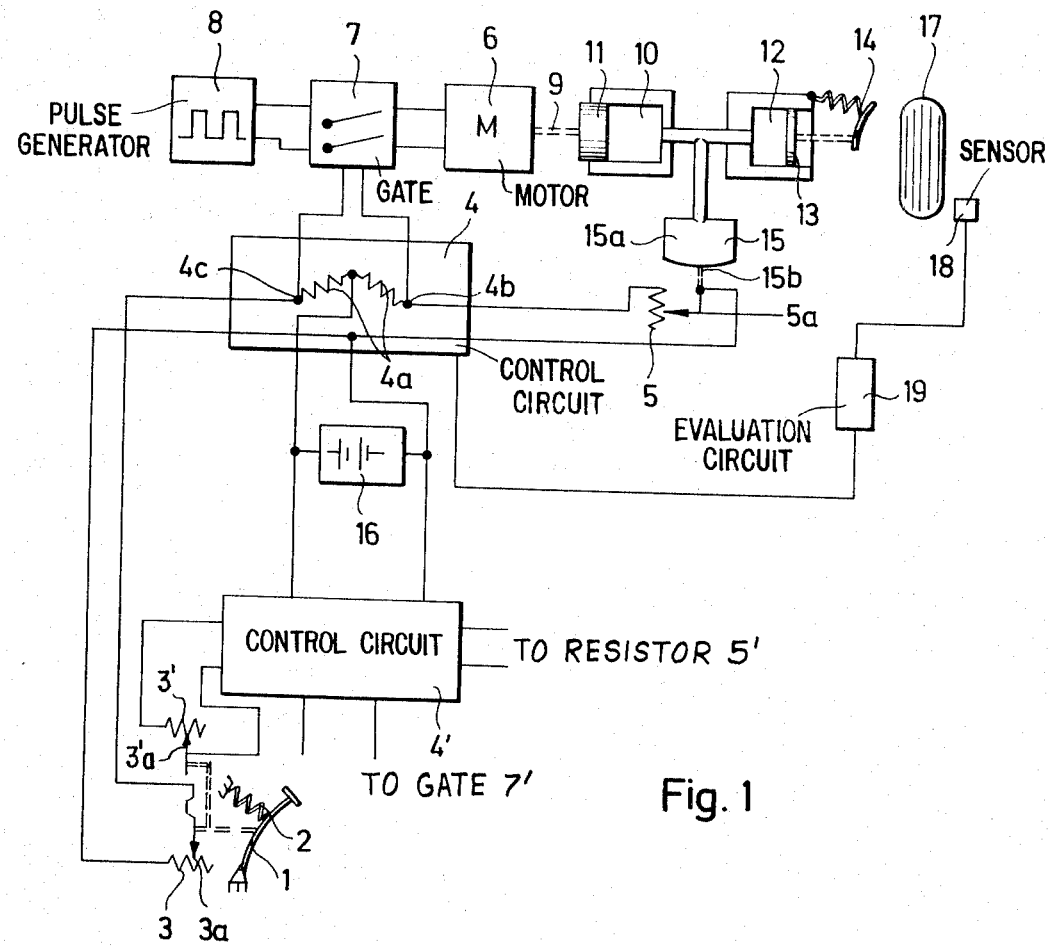
FIG. 1 is a block diagram of an embodiment of a brake system according to the present invention.

FIG. 1 shows a brake system which includes a brake pedal 1 and a reset spring 2 against whose force the brake pedal 1 must be moved. Moving the brake pedal 1 resets a wiper terminal 3a of a variable resistor 3. Thus a portion of the resistor 3 which is dependent on the position of the terminal 3a is included in the one branch of a bridge circuit forming part of a control circuit 4. Two resistors 4a shown in the bridge circuit are fixed resistors. The bridge circuit is completed by a portion of a resistor 5 whose resistor portion which is effective in the bridge circuit depends on the position of a wiper terminal 5a. If the bridge circuit formed by resistors 3, 4a, 4b and 5 is balanced, the voltage between points 4b and 4c is zero and a motor 6 is at rest. If the equilibrium of the bridge circuit is destroyed by a change in the respective portion of the resistor 3, a voltage appears between the points 4b and 4c which, depending on its polarity, feeds pulses from a pulse generator 8 to the motor 6 with the aid of a gating circuit 7 in such a manner that the motor 6 rotates in one or the other direction. This rotation of the rotor of the motor 6 is translated, as already mentioned, into a longitudinal movement of a spindle 9 so that a piston 11 in a cylinder 10 is moved in one or the other direction. This exerts a pressure on brake fluid in the cylinder 10 as well as in a connected brake cylinder 12 resulting in movement of a piston 13 of the brake cylinder 12 and thus a more or less strong contact of spring biased brake shoes, generally designated by the numeral 14, with the wheel 17. In practice, the motor 6, the spindle 9, the cylinder-piston arrangement 10/11 and the brake cylinder 12 are fastened together as a unit to the wheel suspension of a vehicle. The brake pressure in the cylinders 10 and 12 is measured by a pressure gauge 15. In the illustrated embodiment, the pressure gauge 15 comprises a cylinder 15a and membrane 15b whose pressure dependent deflection is utilized to vary the position of the wiper terminal 5a of the resistor 5. The current supply for the bridge circuit is provided by a battery 16. Thus, upon depression of the brake pedal 1, an increase in pressure will take place in the cylinders 10 and 12 based on the motor control until a change in the position of the wiper terminal 5a causes a corresponding portion of the resistor 5 to be connected into the bridge circuit which corresponds to a certain brake pressure.

Parts 3–15 are provided separately for each wheel to be braked which is indicated diagrammatically in FIG. 1 only by a control circuit 4' corresponding to the control circuit 4 for a second wheel and a second resistor 3' and terminal 3'a also operated by the brake pedal. A wheel 17 to which the brake shoes 14 belong is also provided with a sensor 18 for producing deceleration and/or slip signals. Such sensors are known. These deceleration and/or slip signals are fed to an evaluation circuit 19 of conventional construction which produces a control signal when the wheel 17 shows a tendency to lock, which control signal is fed to the control circuit 4 and superimposed, for example, on its output signal so that, for example, in spite of a balanced bridge, an output signal from the control circuit 4 will appear when there is danger of locking which starts the motor 6 in such a direction that a pressure reduction within the cylinders 10 and 11 is effected. The evaluation circuit 19 may be equivalent to those shown in FIG. 1-3 of U.S. Pat. application Ser. No. 198,336 filed Nov. 12, 1971 and entitled "Control System." If, according to FIG. 1 and 2 of this application one output signal is produced, this signal will start the motor 6 for pressure reduction. If, however, according to FIG. 3 of this application two output signals are produced, the first signal is used to stop the motor 6 while the second signal will start it for pressure reduction.

Figure 2A:
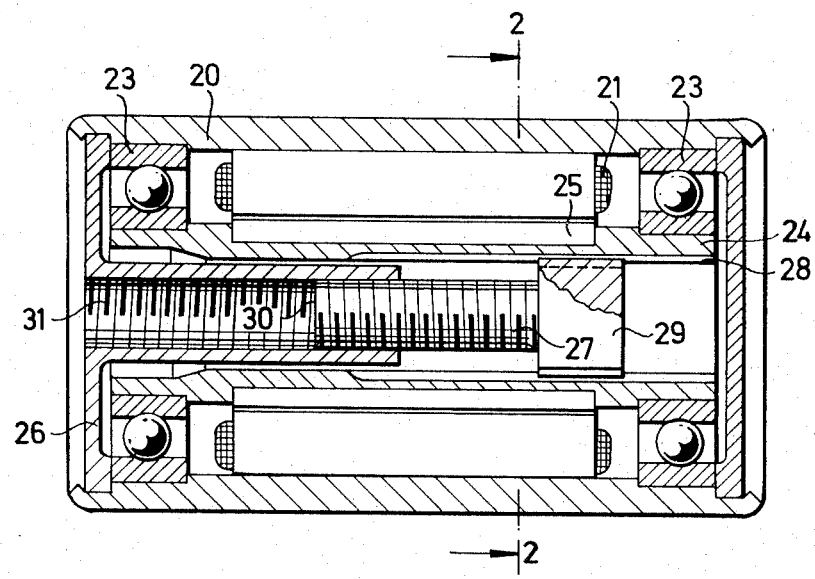
FIGS. 2a and 2b show a possible embodiment of an actuation device in two sectional views.
Figure 2B:
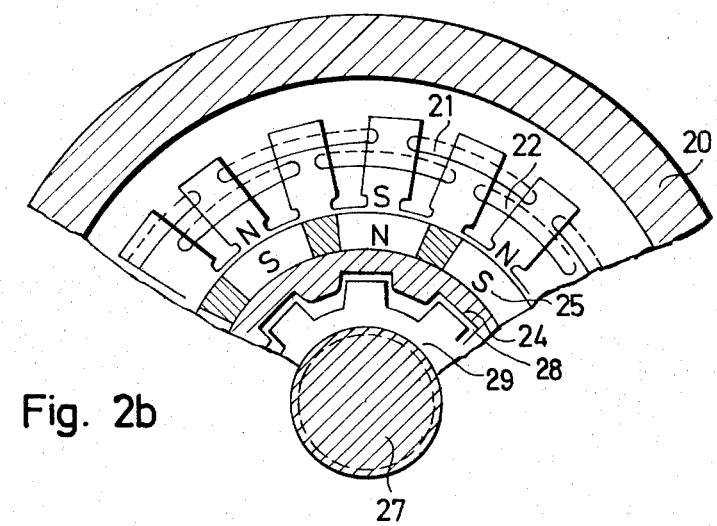

FIGS. 2a and 2b illustrate a possible embodiment for the motor 6 and the spindle 9 of FIG. 1, a stepping motor with a threaded spindle being shown. The motor includes a housing 20 and windings 21 which are fastened thereto. FIG. 2b shows that the windings 21 are wound about a plurality of longitudinal bars 22 formed of magnetizable material. Each winding 21 is positioned about two of the bars 22 and two groups of windings 21 are provided (shown radially offset) which overlap and are consecutively switched on. The windings 21 are so positioned that adjacent windings 21 of a group form electromagnets having different polarities. The motor has a rotor 24 rotatably mounted within the housing 20 by means of the two ball bearings 23. Permanently magnetic rods 25 are fastened in grooves formed on the rotor 24 which rods are magnetized in a radial direction (and of which the adjacent ones have different polarities) so that it is assured that the rotor 24 in the unexcited state is held, e.g. in the illustrated detent position. With the appropriate control of the groups of windings 21, rotation of the rotor 24 is effected in the one or the other direction.

A threaded nut 26 is also fastened to the housing 20 into whose inner threads a spindle 27 is screwed with its outer threads. The rotor 24 is connected to the spindle 27 to be axially movable but secured against rotation by grooves 28 in the rotor 24 and corresponding grooves at the spindle head 29. When the rotor 24 rotates, the spindle 27 moves in axial direction. When the screw connection between the spindle 27 and the threaded nut 26 is very tight the end 30 of the spindle 27 itself can serve as a piston and the chamber 31 as the associated cylinder, these parts then replace the parts of the cylinder-piston arrangement 10 and 11 of FIG. 1.

Figure 3:
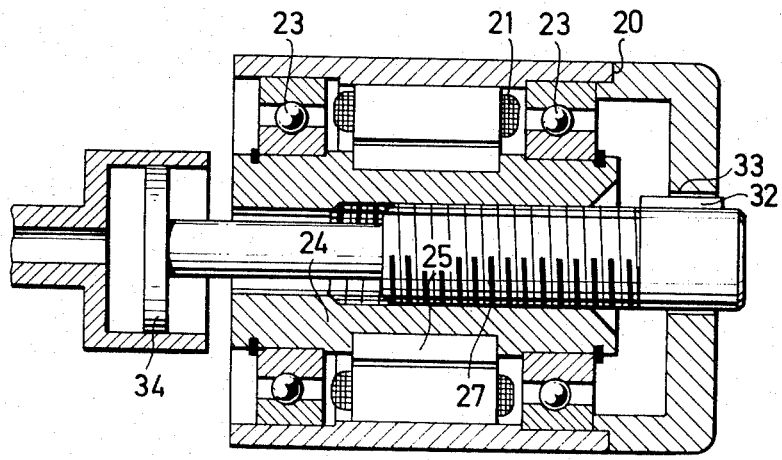
FIG. 3 shows a modification of the embodiment of the actuation device shown in FIGS. 2a and 2b.

For sealing reasons it is more favorable, as shown in FIG. 3, to provide a thread each for the rotor 24 and for the spindle 27 so that these engaging threads effect an axial movement of the spindle 27 when the rotor 24 rotates. In this case the spindle 27 must be secured against rotation for which purpose a lug 32 fastened to the spindle 27 engages in a slit 33 in the housing 20. In this case the spindle 27 actuates a separate piston 34.

Figure 4:
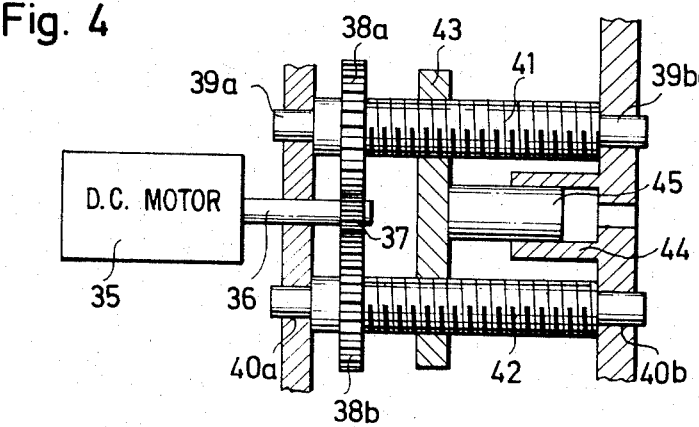
FIG. 4 shows another embodiment of an actuation device.

A further example of an arrangement for the translation of a motor rotation into longitudinal movement of a part effecting the change in volume of the brake fluid is shown in FIG. 4 which shows a conventionally constructed motor 35, which may be, for example, a d.c. motor. When the motor 35 rotates, it drives two threaded bolts 41 and 42 via a pinion 37 fastened to its driven shaft 36 and toothed wheels 38a and 38b in engagement therewith, the two threaded bolts 41 and 42 being mounted respectively at points 39a and 39b, and points 40a and 40b. A disc 43 is provided with two openings having inner threading with which the threads of the bolts 41 and 42 are respectively in engagement. Thus rotation of the bolts 41 and 42 effects an axial displacement of the disc 43 in one or the other direction depending on the direction of rotation. The disc 43, as shown, moves a piston 45 fitting into a cylinder 44 so that different pressures are produced on the pressure medium in the cylinder 44 and in a connected brake cylinder (not shown in FIG. 4).

The embodiment described in the preceding paragraph has the advantage that neither axial nor lateral forces act on the motor shaft 36 which constitutes a substantial reduction in expenditure for the motor.

Figure 5:
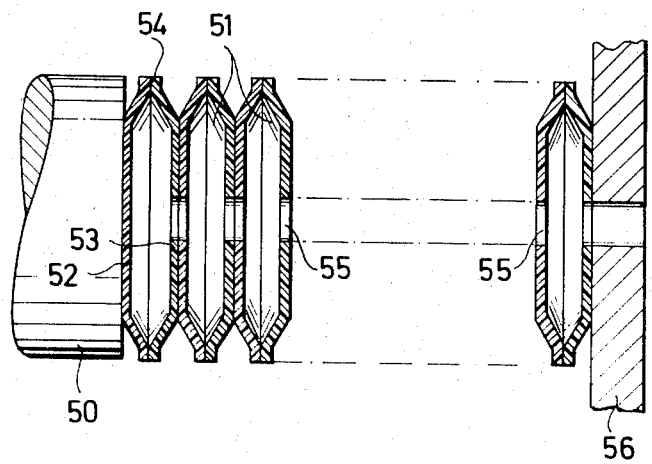
FIG. 5 shows an embodiment for the configuration of an actuation bellows.

The cylinder-piston arrangements of FIGS. 1-4 for the variation of pressure may also be replaced by a bellows. A favorable embodiment for such a bellows in shown in FIG. 5. There the part 50 performing the longitudinal movement, i.e., for example the longitudinal movement of spindle 27 (FIGS. 2a, 2b and FIG. 3) or the disc 43 (FIG. 4). The bellows itself is formed of a plurality of individual cells 51 arranged one beside the other. Each cell 51 is formed of two discs 52 and 53 which are connected together or welded, respectively, along their periphery 54. The discs 52 and 53 may consist of rubber or plastic, e.g. of a fiber-reinforced plastic. Except for the wafer formed of two adjacent discs farthest to the left, all of the wafers formed of two adjacent discs are provided with center openings 55. In the vicinity of each of the individual openings 55, adjacent cells 51 of the bellows are connected together for sealing reasons. If a longitudinal displacement of the part 50 is effected, the bellows is compressed between a supporting part 56 and the part 50 so that pressure fluid present in the cells 51 is pressed through the openings 55 toward the brake cylinder (not shown in FIG. 5). The width of the cells 51 is small and amounts to, for example, 0.2 mm.

Figure 6:
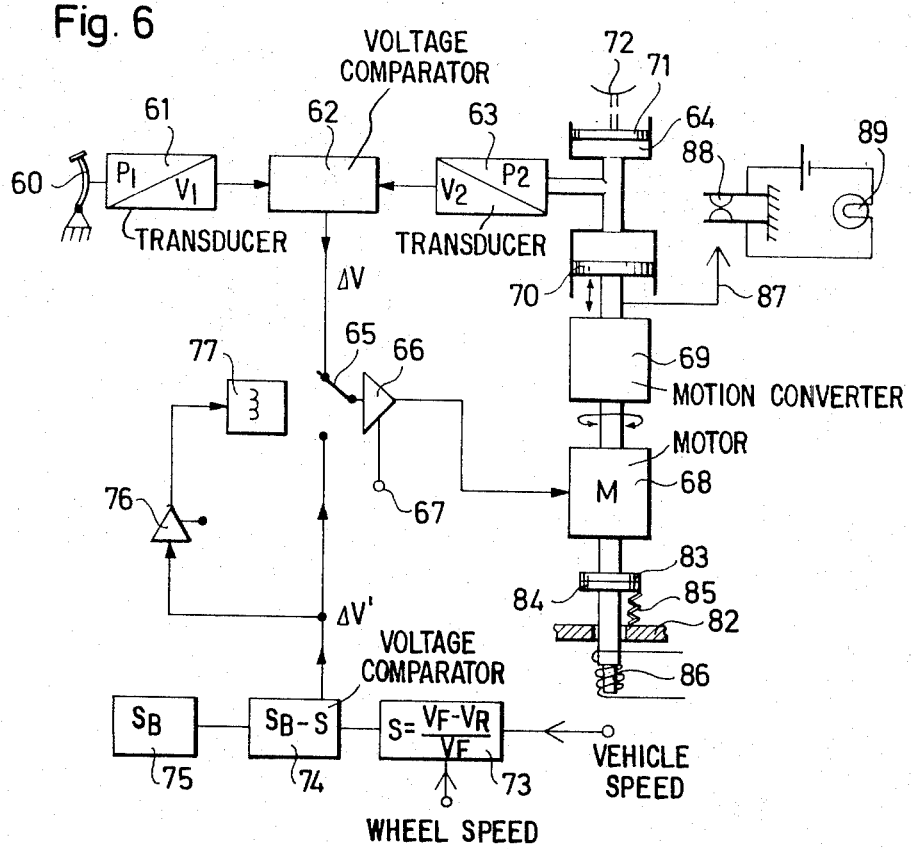
FIG. 6 is a block circuit diagram of another embodiment of a brake system according to the present invention.

A further embodiment of the brake system according to the present invention, including a control effected when there is a tendency to lock, is illustrated in FIG. 6. As shown in FIG. 6, the brake system includes a brake pedal 60, a pedal pressure-to-voltage transducer 61, which corresponds, for example, to the pedal pressure voltage transducer 2,3 of FIG. 1. The voltage signal produced by the transducer 61 is compared in a voltage comparator 62 with the voltage signal of brake pressure produced by a pressure-to-voltage transducer 63, which is connected with a brake cylinder 64 and produces a voltage proportional to the pressure in the brake cylinder 64. A control signal $\Delta V$ results from this comparison in the voltage comparator 62 which is fed via a contact 65 to a threshold value switch or amplifier 66. If the voltage $\Delta V$ exceeds a given value, a battery (not shown) connected to a terminal 67 is connected to a motor 68 with a polarity depending on the polarity of the voltage $\Delta V$, and the motor 68 then rotates in a certain direction. The rotary movement of the motor 68 is translated in motion converter 69, e.g. a gearing arrangement, into a longitudinal movement so that a piston 70 is moved and a piston 71 of the brake cylinder 64 is displaced. Thus, depending on the position of the brake pedal 60, a more or less strong pressure is exerted into brake shoes designated generally by the numeral 72.

If a tendency to lock is produced at the wheel (not shown in FIG. 6) at an existing brake pressure, the position of the switch 65 is changed. In the illustrated embodiment the tendency to lock is sensed from the occurrence of wheel slip; however, in a known manner the rotational deceleration of the wheel and possibly also the acceleration, or both values (slip and rotational deceleration/acceleration) can serve as the control signal values.

As already mentioned, in the embodiment of FIG. 6 the slip of the wheel serves as the control criterion. The wheel slip $$S = V_F - V_R/V_F$$

($V_F$ = speed of the vehicle, $V_R$ = speed of the wheel) or a value corresponding to the wheel slip, respectively, is generated in a circuit 73 to whose input terminals is fed, in a known manner, a signal value corresponding to the speed of the wheel and a signal value corresponding to the speed of the vehicle. In a voltage comparator 74 a voltage signal corresponding to the momentary wheel slip or a corresponding value, respectively, is compared with the comparison voltage signal value $S_B$ obtained from a circuit 75 which signal value also determines the maximum permissible slip, and a control value $\Delta V'$ is produced which excites a relay 77 via a threshold level switch 76 and switches the contact 65 and which, on the other hand, then actuates the motor 68 via the threshold amplifier 66. When threshold $S_B$ is exceeded and the threshold of threshold amplifier 66 is reached, the motor 68 is rotated in such a manner that the brake pressure is reduced. When the signal falls below the threshold $S_B$, the brake fluid pressure first remains constant until the slip exceeds the comparison value by a given amount. Then the brake fluid pressure is increased again. The controller for motor 68 is thus a three-mode controller.

Figure 7:
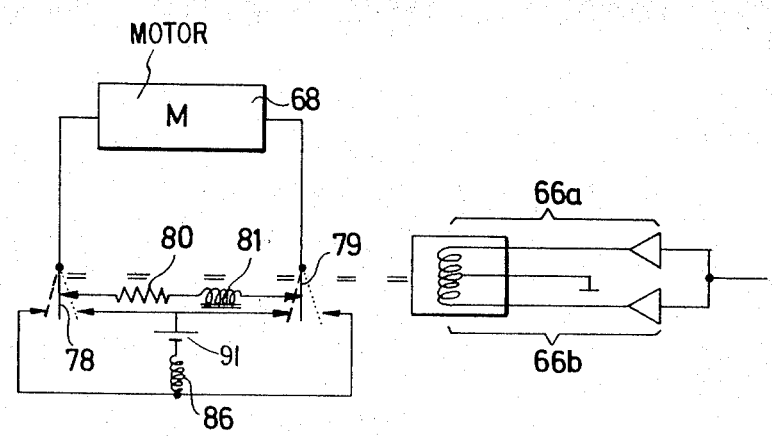
FIG. 7 shows a control circuit for an actuation motor.

The basic circuit diagram of the threshold amplifier 66 in combination with the motor 68 is shown in FIG. 7. The threshold amplifier, as illustrated in FIG. 7, is divided into two threshold value switch arrangements 66a and 66b for producing positive and negative control signals. If switch arrangement 66a responds to a control signal of one polarity, contacts 78 and 79 are moved, for example, toward the left into the position shown in dashed lines. Thus the motor 68 is connected with the battery 91 with a given polarity and rotates in a given direction. If upon the occurrence of the control signal with the other polarity, the other switch arrangement 66b of the threshold amplifier circuit responds, the contacts 78 and 79 are moved toward the right into the second position shown in dashed lines. The direction of rotation of the motor 68 is thus in the opposite direction.

If neither of the threshold values is exceeded, the contacts 78 and 79 are in center position, as shown in solid lines, where they establish contact with the series connection of a resistor 80 and an inductance 81. With this connection the motor 68 is immediately stopped, as a result of damping, when the operating voltage is switched off. Instead of the above-described electrical brake, it is also possible to use a mechanical brake.

In the arrangement according to the present invention care must be taken that the motor 68, as illustrated in FIG. 6 for example, is not rotated by the brake pressure when there is no operating voltage. This can be achieved by the appropriate friction in the member 69. It is better, however, to provide a brake 82 (FIG. 6) for this purpose which comprises a brake disc 83 fastened to the shaft of the motor 68 and a counter disc 84 which can be displaced only in the axial direction. Due to a spring 85 the disc 83 and the counter disc 84 are pressed together when the motor 68 is not excited. If, however, the motor 68 is excited, a coil 86, shown in FIG. 7, which is identical with the coil 86 of FIG. 6, receives current and lifts the counter disc 84 away from the brake disc 83.

In the brake system according to the present invention it is very easy to determine whether there is a leak in the hydraulic unit or whether the brake lining is very much worn off. For this purpose, a maximum path is determined for the bellows or piston 11 in FIG. 1 or the piston 70 in FIG. 6, respectively, exceeding of which produces a warning. This is indicated in FIG. 6, for example, in which an actuation member 87 which is connected with the piston 70 closes two contacts 88 when the piston 70 is correspondingly displaced so that a warning lamp 89 or the like is switched on.

Figure 8:
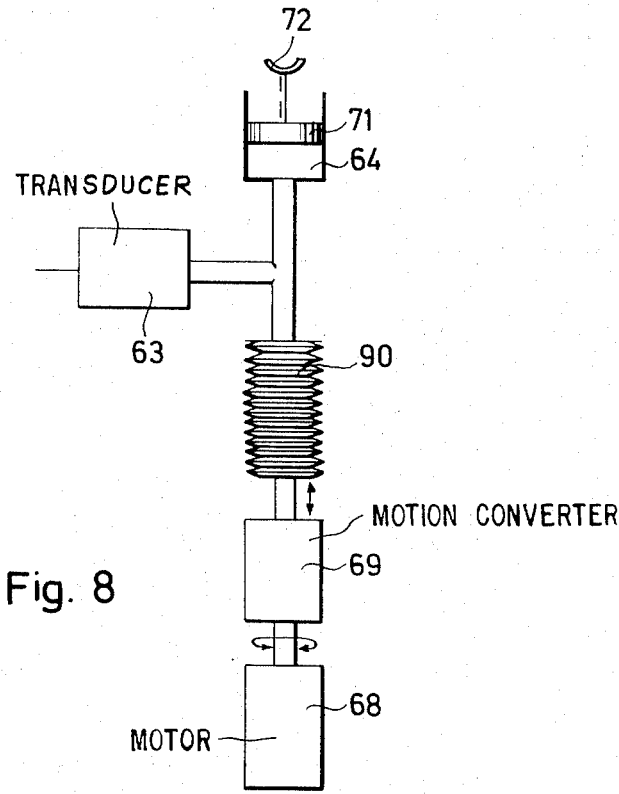
FIG. 8 is a block diagram of a portion of the system of FIG. 6 illustrating another embodiment of an actuation device.

FIG. 8 is a schematic and partially sectional view of a modified version of part of the circuit of FIG. 6 showing the parts 63, 64, 68, 69, 71 and 72 of the circuit shown in FIG. 6. It shows essentially that the same effect can be realized by replacing the piston 70 (FIG. 6) with its associated cylinder by a bellows 90. The bellows 90, shown diagrammatically may but must, not be the bellows shown in FIG. 5. The important additional aspect is that the bellows 90 must be able to withstand the high pressures which occur.

It will be understood that the above description of the present invention is susceptible to various modifications, changes and adaptations, and the same are intended to be comprehended within the meaning and range of equivalents of the appended claims.

I claim:

1. In a brake system for a vehicle, the system including means responsive to electrical signals for causing brake means which include wheel brake cylinders to respond whenever electrical signals are applied and electrical position generator means actuatable by a driver during braking for producing electrical position signals to initiate brake actuation, the improvement wherein said means for causing the brake means to respond comprises in combination: a separate hydraulic means, including means defining a brake fluid volume, connected with the respective wheel brake cylinder of each wheel to be braked, so that changes in brake fluid volume of each means defining a brake fluid volume serves to influence the brake pressure in the respective one of said wheel brake cylinders; separate measuring means for determining the force exerted on the brake of each wheel to be braked and for producing a corresponding respective electrical output signal for each wheel to be braked; a separate control circuit means for each wheel to be braked, each said control circuit means being responsive to the output signals from a respective one of said measuring means and to the electrical signals from said position generator means for producing a respective control signal for each wheel to be braked; and separate brake acutation means individually responsive to a respective one of said control signals for individually changing the brake fluid volume defined by each of said means defining a brake fluid volume, whereby certain brake pressures at each of the brakes correspond to each position of the position generator means.

2. An arrangement as defined in claim 1 wherein each of said hydraulic means comprises a cylinder with a piston on which a respective one of said actuation means acts and through which the brake fluid volume defined by a respective one of said means defining a brake fluid volume is changed.

3. An arrangement as defined in claim 1 wherein each of said hydraulic means comprises a bellows on which a respective one of said actuation means acts.

4. An arrangement as defined in claim 3 wherein said bellows comprises a plurality of cells one behind the other with each of said cells being formed of two discs connected together along their peripheries, and with adjacent cells being connected together by an opening.

5. An arrangement as defined in claim 4 wherein adjacent ones of said cells are sealed together at least in the vicinity of the opening.

6. An arrangement as defined in claim 4 wherein said discs are formed of fiber-reinforced plastic.

7. An arrangement as defined in claim 1 wherein each of said measuring means comprises a pressure gauge which measures the pressure in a respective one of said wheel brake cylinders.

8. An arrangement as defined in claim 1 wherein each of said actuation means includes a motor, each said motor being coupled to a respective one of said means defining a brake fluid volume and effects a change in the volume.

9. An arrangement as defined in claim 8 wherein each of said acutation means includes motion converting means, including threaded means, for converting the rotation of said motors to axial displacements.

10. An arrangement as defined in claim 9 wherein said threaded means comprises a mounted threaded member secured against rotation, said threaded member being in engagement with a portion of the rotor of the motor which is provided with threads so that rotation of the rotor effects axial movement of said threaded member.

11. An arrangement as defined in claim 9 wherein said threaded means comprises a stationary threaded member and a further threaded member which is in engagement with the thread of the stationary threaded member, is coupled to the rotor of the motor, is secured against rotation and is axially movable.

12. An arrangement as defined in claim 9 wherein said threaded means comprises at least two threaded spindles arranged parallel to one another, said spindles being in operative connection with the rotor of the motor in such a manner that during rotation of the motor they are rotated in the same direction of rotation, and a movable member, said threaded spindles being screwed into said movable member in such a manner that during rotation of the motor the movable member is caused to move in an axial direction.

13. An arrangement as defined in claim 9 wherein each of said motors is a stepping motor.

14. An arrangement as defined in claim 1 wherein each of said control circuit means includes a bridge circuit, one bridge circuit being provided for each wheel to be braked, the bridge branch resistances being varied at least in part by said position generator means and, on the other hand, by a respective one of said measuring means, the signals occurring in the bridge diagonal when the bridge is out of balance serving to control the associated actuation means.

15. An arrangement as defined in claim 1 wherein each of said means for causing the brake means to respond is a three-mode controller whereby the brake pressure can be raised, kept approximately constant and lowered.

16. An arrangement as defined in claim 15 wherein each of said control circuit means comprises voltage comparator means responsive to the electrical signals from said position generator means and the electrical signals from a respective one of said measuring means for producing a voltage difference signal, a threshold switching means responsive to the difference voltage signal for producing a control signal, and means connected between said threshold switching means and a respective one of said brake actuation means for feeding the control signal to the brake actuation means, whereby the brake pressure can be raised, kept approximately constant and lowered.

17. An arrangement as defined in claim 16 wherein each of said brake actuation means comprises a motor, each motor having a pair of terminals, and means for connecting said terminals together via a resistor whenever the respective motor is in its unfed state.

18. An arrangement as defined in claim 16 wherein each of said brake actuation means comprises a motor, each motor having a mechanical brake, and means for causing said brake to act on the respective motor whenever it is in its unfed state.

19. An arrangement as defined in claim 18 further comprising an electromagnet associated with each brake for making the associated brake ineffective whenever the respective motor is in its fed state.

20. An arrangement as defined in claim 16 further comprising an antilocking system for each wheel to be braked, each antilocking system comprising sensor means and an evaluation circuit responsive to output signals from said sensor means, said evaluation circuit producing signals for controlling a respective one of said actuation means.

21. An arrangement as defined in claim 16 further comprising an antilocking system for each wheel to be braked, each antilocking system comprising sensor means for sensing wheel slip or wheel deceleration and producing a control signal, and evaluation circuit means responsive to the control signal from said sensor means for producing an output signal, further comprising means responsive to the output signal from said evaluation circuit means for disconnecting said voltage comparator from said threshold switching means and for supplying the output signal from said evaluation circuit means to said threshold switching means.

22. An arrangement as defined in claim 15 further comprising an antilocking system for each wheel to be braked, each antilocking system comprising sensor means for sensing wheel slip or wheel deceleration and producing a control signal, and evaluation circuit means responsive to the control signal from said sensor means for producing an output signal, and further comprising means responsive to the output signal from said evaluation circuit means for disconnecting said control circuit means from said brake actuation means and for supplying the output signal from said evaluation circuit means to said brake actuation means.

23. An arrangement as defined in claim 1 further comprising a separate alarm means for each wheel to be braked, each alarm means comprising an actuation device provided for a contact of an electrical warning circuit which actuation device is displaced when the volume of brake fluid for a respective wheel is changed and which actuates the contact when the volume is reduced beyond a given minimum volume.

24. An arrangement as defined in claim 1 further comprising an antilocking system for each wheel to be braked, each antilocking system comprising sensor means and an evaluation circuit responsive to output signals from said sensor means, said evaluation circuit producing signals for controlling a respective one of said actuation means.

* * * * *